(12) United States Patent
Yeom (10) Patent No.: US 7,236,483 B2
(45) Date of Patent: Jun. 26, 2007

(54) METHOD FOR CONTROLLING BANDWIDTH IN A VOICE OVER INTERNET PROTOCOL SYSTEM

(75) Inventor: Eung-Moon Yeom, Uiwang-shi (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 912 days.

(21) Appl. No.: 10/183,978

(22) Filed: Jun. 28, 2002

(65) Prior Publication Data

US 2004/0002864 A1 Jan. 1, 2004

(51) Int. Cl.
*H04L 12/66* (2006.01)
(52) U.S. Cl. .................. 370/352; 370/401; 370/468
(58) Field of Classification Search ............ 370/401, 370/468, 229, 230, 352, 356, 400, 395.52, 370/395.41, 395.2, 395.21, 471
See application file for complete search history.

(56) References Cited

U.S. PATENT DOCUMENTS 6,865,150 B1* 3/2005 Perkins et al. ............... 370/230
6,909,690 B1* 6/2005 Xu et al. ..................... 370/230
7,054,327 B2* 5/2006 Hagirahim et al. ......... 370/410

OTHER PUBLICATIONS

Bur Goode, "*Voice Over Internet Protocol* (VoIP)," IEEE, vol. 90, No. 9, pp. 1495-1517, Sep. 2002.

* cited by examiner

*Primary Examiner*—Chi Pham
*Assistant Examiner*—Alexander O. Boakye
(74) *Attorney, Agent, or Firm*—Robert E. Bushnell, Esq.

(57) ABSTRACT

A method for controlling bandwidth in a Voice over Internet Protocol (VoIP) system provided with gateways that are capable of performing real time bidirectional communication between endpoint terminals over the Internet, where the endpoint terminals include voice and image and/or data communication, includes the steps of calculating total bandwidth usage of each gateway upon receiving a call setup request from an endpoint terminal in consideration of the number of calls currently being processed and the bandwidth usage according to coder/decoder (codec) usage for each call, and transferring the calculated total bandwidth usage to other gateways in the VoIP system.

9 Claims, 7 Drawing Sheets

METHOD FOR CONTROLLING BANDWIDTH IN A VOICE OVER INTERNET PROTOCOL SYSTEM

BACKGROUND OF THE INVENTION

1. Technical Field

The present invention relates generally to a Voice over Internet Protocol (hereinafter, abbreviated to "VoIP") system and, in particular, to a method for controlling bandwidth therein.

2. Related Art

The VoIP is a new communication service system in which people make voice calls through the Internet network rather than through the PSTN (Public Switch Telephone Network). Unlike the old system, the new call system over the Internet uses a packet-based network so that people can make voice calls at lower cost, not paying domestic/overseas phone line charge. In addition, using ITU-T (International Telecommunications Union-Telecommunications standardization sector), H.323, the VoIP can send not only audio information but also video information.

The VoIP service work includes the Internet as a backbone, and gateways and personal computers are connected to the Internet. Each gateway is associated with the PSTN, which is connected to phone terminals and fax terminals. The terminals (i.e., phone terminals, fax terminals, and PCs) are endpoints, meaning that during 1:1 communication or meetings, one can communicate with another through audio (essential), video (optional), and data (optional). Every terminal is for bidirectional communication with gateways and with other terminals. Especially, the gateways are essential components, enabling real time bidirectional communication through the Internet using terminals connected to the Internet, that is, the packet based network, such as PCs, and PSDN, or using terminals connected to ISDN (Integrated Services Digital Network), such as phone terminals and fax terminals.

The VoIP network might or might not have a gatekeeper. The gatekeeper is located between the Internet and the gateways. Mainly, the gatekeeper converts aliases (phone numbers, names) to IP (Internet Protocol) addresses during calls between terminals. More specifically, the gatekeeper performs admission control, network bandwidth control, zone management, call detail record & storage, terminal alive check, alternate gatekeeper, logging and statistics.

Generally, when the VoIP service network has a gatekeeper, the gatekeeper performs the function of bandwidth control. The control is accomplished by calculating a rough bandwidth based on the number of Internet calls that are pending in the gateway. For example, suppose that the occupied bandwidth per call is 10 kbps (kilo bit per second), and 200 calls are pending. Then, the currently used bandwidth becomes 2 Mbps (mega bits per second). If T.38 fax call service is concerned, the gatekeeper, being unable to distinguish a fax call from a voice call, treats the pending call as a voice call and calculates the bandwidth usage anyway. What the fax call service really requires is about 20 kbps to 30 kbps occupied bandwidth per fax call. However, as the gatekeeper regards the fax call as another voice call and calculates the bandwidth usage therefrom, it is difficult to determine the actual total bandwidth usage.

In the case of a VoIP service network without a gatekeeper, the gateway or endpoint is not informed of the current trafficability of a remote gateway so that it cannot calculate the bandwidth usage in any way. For that reason, the VoIP service network without a gatekeeper could not perform effective VoIP call routing.

SUMMARY OF THE INVENTION

It is, therefore, an object of the present invention to provide a method for controlling bandwidth in a VoIP (Voice over Internet Protocol) service network for effective call routing, especially in a VoIP service network without a gatekeeper.

Another object of the present invention is to provide a method for calculating total bandwidth of the network considering Internet fax calls and Internet voice calls in a VoIP service network without a gatekeeper.

Still another object of the present invention is to provide a method for transferring traffic throughput of a local gateway to a remote gateway.

Still another object of the present invention is to provide a method for transferring total traffic usage between nodes to a remote gateway, in which the total bandwidth usage between nodes is calculated by a local bandwidth control gateway based on bandwidth usage of the local gateway and information on a destination node.

Yet another object of the present invention is to provide a method for performing effective routing by a local gateway in a VoIP service network without a gatekeeper in accordance with traffic throughput of a remote gateway.

Yet another object of the present invention is to provide a method for controlling bandwidth for effective routing in a VoIP service network with a gatekeeper.

To achieve the above objects, there is provided a method for controlling bandwidth in a VoIP service network provided with gateways that are capable of conducting real time bidirectional communication between endpoint terminals over the Internet, where the endpoint terminals include voice and one of image or data for communication. The method includes the steps of: calculating total bandwidth usage by each gateway upon receiving a call setup request from the endpoint terminal in consideration of the number of calls currently processed and bandwidth usage according to usage coder/decoder (codec) of each call; and transferring the calculated total bandwidth usage to other gateways in the VoIP service network.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
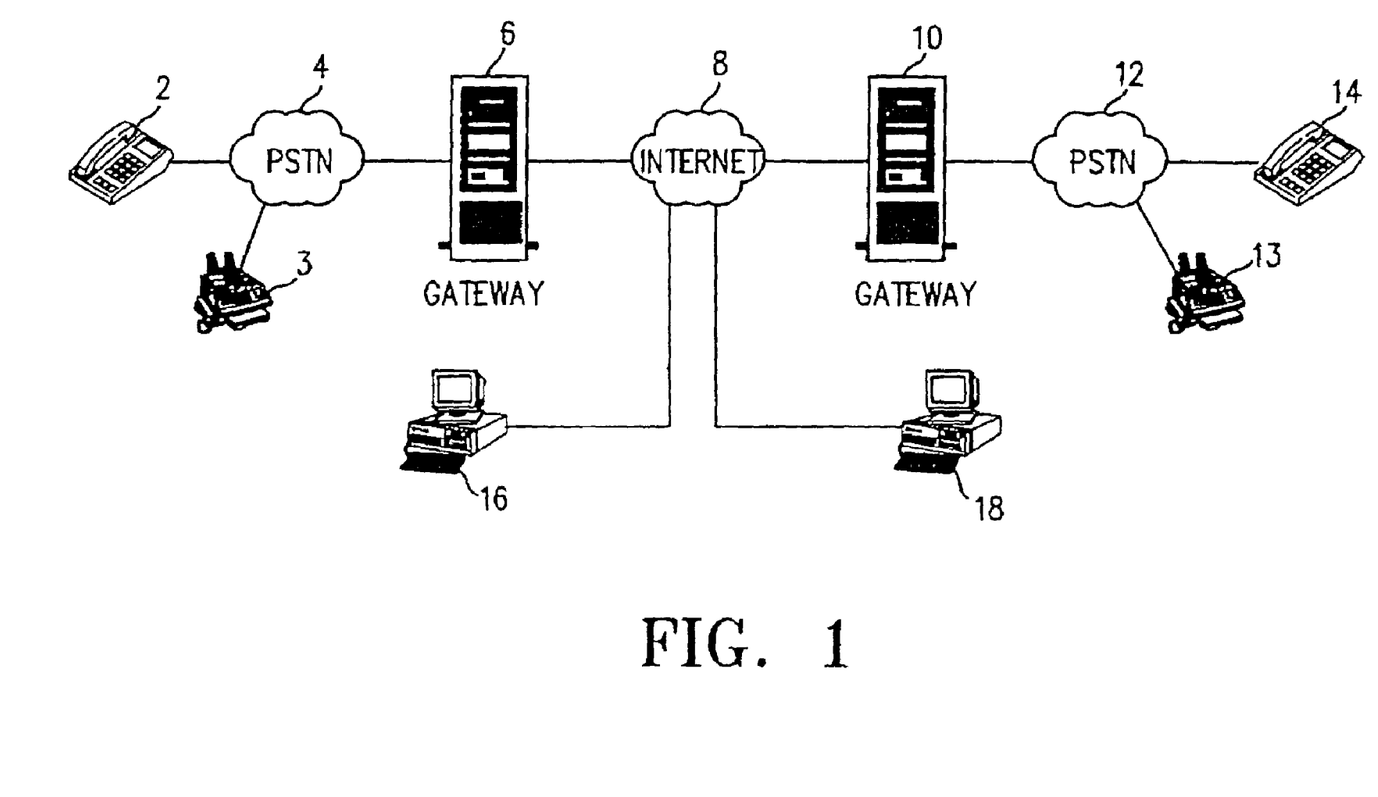
FIG. 1 is a schematic diagram illustrating a Voice over Internet Protocol (VoIP) service network.

To explain the preferred embodiment of the present invention, the VoIP (Voice over Internet Protocol) service network illustrated in FIG. 1 basically comprises gateways 6 and 10 connected to Internet 8, telephone 2 and fax 3 connected via public switched telephone network (PSTN) 4 to gateway 6, and telephone 14 and fax 13 connected via PSTN 12 to gateway 10. Personal computers (PCs) 16 and 18 are also connected via Internet 8 to gateways 6 and 10.

Generally, the VoIP service absolutely requires a gatekeeper to determine bandwidth of each gateway. That is, effective VoIP call routing in the VoIP service is possible only through the gatekeeper having a bandwidth control function. However, in this case, the calculation of the bandwidth is based on the Internet voice calls currently being processed, and bandwidth which varies for each different Internet call. In other words, bandwidths (e.g., 5.3 kbps, 6.3 kbps, 8 kbps, 9.6 kbps, 64 kbps) that could be different, depending on the usage of voice codec for each call (hereinafter, referred to as "VoIP codec"), are not necessarily concerned. Therefore, it is impossible to perform very effective VoIP call routing in the VoIP service network without a gatekeeper.

In the embodiment of the present invention, on the other hand, each gateway 6 and 10 shown in FIG. 1 directly calculates bandwidth usage in consideration of the VoIP voice process and FoIP fax call process in the VoIP service network without any gatekeeper.

The procedure of calculating bandwidth usage by gateways 6 and 10 based on the VoIP voice call process is explained as follows.

In the preferred embodiment of the present invention, the gateways 6 and 10 first calculate actual bandwidth usage in consideration of the number of calls being currently processed and bandwidth according to VoIP codec usage for each call. Since PCM voice data in a general phone line has 64 kbps bandwidth, which is not appropriate for the VoIP service, the gateways 6 and 10 of the present invention include VoIP codecs for voice compression. Typically, the voice compression format of voice codec is one of G.723.1, G.729A, G.711 and so forth. Particularly, the G.723.1 voice codec can compress PCM voice data to 6.4 kbps, and the G.729A voice codec can compress the PCM voice data to 8 kbps.

Figure 2:
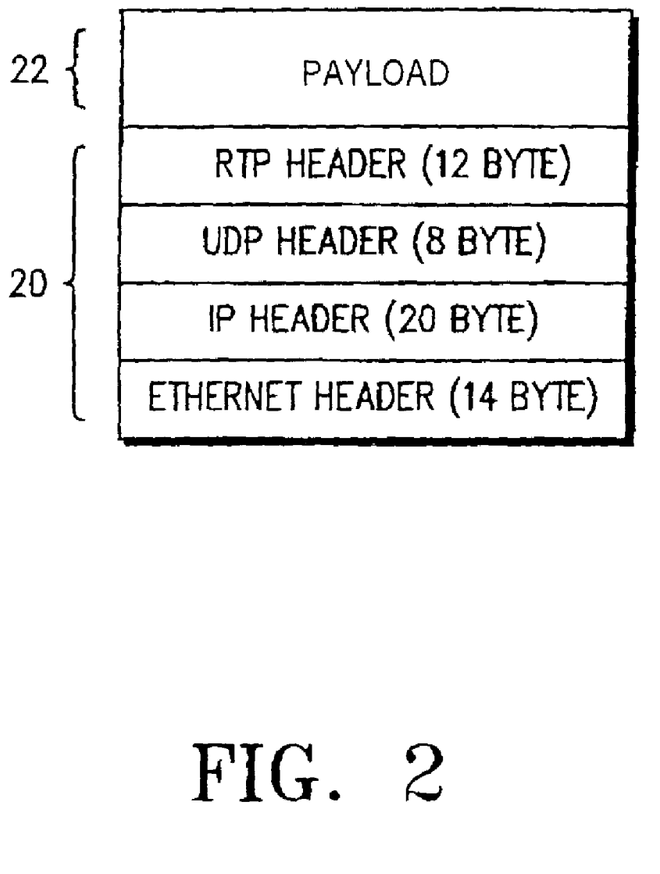
FIG. 2 is an exemplary diagram of a VoIP packet format.

The VoIP packet format necessary to calculate the actual bandwidth usage of the VoIP codec available for each call is now explained. FIG. 2 illustrates a diagram of the format of a VoIP packet that includes four kinds of headers 20 and a payload 22. The headers 20 are configured for a total of 54 bytes and include the following.
1. RTP (Realtime Transfer Protocol) header: 12 bytes
2. UDP (User Datagram Protocol) header: 8 bytes
2. IP (Internet Protocol) header: 20 bytes
3. Ethernet header: 14 bytes Since the typical bandwidths stipulated for the VoIP codec (e.g. 5.3 kbps, 6.3 kbps, 8 kbps, 9.6 kbps, 64 kbps) concern the payload only, the actual bandwidth of each VoIP codec can be known only after considering both the payload and the headers, that is, the actual size of the packet. Therefore, the present invention introduces a method for calculating actual bandwidth according to the usage of the VoIP codec of each call for transferring the voice packet with the above format in accordance with the following:

(1) When the G.723.1 5.3 kbps VoIP codec (a G 723.1 voice compressed codec that can compress PCM voice data to 5.3 kbs) is used, a packet with a total of 74 bytes (RTP payload of 20 bytes plus 54 bytes of the headers) is transferred every 30 ms. The actual bandwidth usage at this time is 19.7 kbps, (20 bytes+54 bytes)*(1 sec/30 ms)*8 bit.

(2) When the G.723.1 6.3 kbps VoIP codec (a G 723.1 voice compressed codec that can compress PCM voice data to 6.3 kbs) is used, a packet with a total of 78 bytes, RTP payload 24 bytes plus 54 bytes of the headers) is transferred every 30 ms. The actual bandwidth usage at this time is 20.8 kbps, (24 bytes+54 bytes)*(1sec/30 ms)*8 bit.

(3) When the G.729A 8 kbps VoIP codec (a G 729A voice compressed codec that can compress PCM voice data to 8 kbs) is used, a packet with a total of 64 bytes (RTP payload 10 bytes plus 54 bytes of the headers) is transferred every 10 ms. The actual bandwidth usage at this time is 51.2 kbps, (10 bytes+54 bytes)*(1 sec/10 ms)*8 bit.

(4) When the G.711A/u 64 kbps VoIP codec (a G 711A/u voice compressed codec that can compress PCM voice data to 64 kbs) is used, a packet with a total of 94 bytes (RTP payload 40 bytes plus 54 bytes of the headers) is transferred every 5 ms. The actual bandwidth usage at this time is 150.4 kbps, (40 bytes+54 bytes)*(1 sec/10 ms)*8 bit.

In short, the actual bandwidth usage according to the usage VoIP codec for each call is:

G.723.1 5.3 kbps: 20 byte/30 ms (the actual bandwidth usage 19.7 kbps=(20+54)*33.3*8)

G.723.1 6.3 kbps: 24 byte/30 ms (the actual bandwidth usage 20.8 kbps=(24+54)*33.3*8)

G.729A 8 kbps: 10 byte/10 ms (the actual bandwidth usage 51.2 kbps=(10+54)*100*8)

G.711A/u 64 kbps: 40 byte/5 ms (the actual bandwidth usage 150.4 kbps=(40+54)*200*8)

Further, the following items are also considered to decrease the above-mentioned actual bandwidths that are calculated in the VoIP codec.

Silence Suppression: Because more than 50% of the call is silence, it is possible to decrease the bandwidth by 50% or higher.

Multiframe transfer: It is transferred to the Multiframe to decrease overhead of every kind of header.

As explained, each VoIP codec, having considered the silence suppression, processes 50% of the call as silence. In such case, new bandwidths of the usage of the VoIP codec for each call are obtained (i.e., G.723.1 5.3 kbps is recalculated to 10 kbps, G.723.1 6.3 kbps is recalculated to 11 kbps, G.729A is recalculated to 26 kbps, and G.711 is recalculated to 75 kbps).

Next, the actual bandwidth usage can be also decreased by the Multiframe transfer function. In the case of G.723.1, the RTP payload can be bundled into 3(90 ms) at the most, and in the case of G.729A, the RTP payload can be bundled into 9(90 ms) at the most. For the jitter buffering of the H.323 endpoint terminal receiving voice packets, at least 2 (180 ms) frames (i.e., multiframe) should be buffered. This is because the H.323 SPEC limits the delay of the terminal itself to 180 ms. Accordingly, the multiframes of the present invention are packed to 3 bundles and 9 bundles for transfer. Although the multiframes could be packed to more bundles in some cases, it is preferable to limit the number of multiframes to avoid any delay problems. For this reason, the number of frames is 2 or 3 for G.723.1, and at the most the number of frames is 9 for G.729A for multiframe transfer.

Lastly, when both multiframe transfer and silence suppression are considered, one example of how to calculate the actual bandwidth of the VoIP codec is provided below.

In the case where three frames using G.723.1 5.3 kbps VoIP codec are transferred as a multiframe, a packet having a total of 114 bytes (RTP payload 60 bytes (20 bytes×3) plus 54 byte headers) is transferred every 90 ms (30 ms×3). The actual bandwidth usage at this time is approximately 10 kbps, (60 bytes+54 bytes)*(1 sec/90 ms)*8 bit. Here, if the silence suppression function is also included, the bandwidth of the G.723.1 5.3 kbps VoIP codec becomes 5 kbps.

According to the present invention, the actual bandwidth usage per VoIP codec having the silence suppression function and the multiframe transfer function (that is, the actual bandwidth per voice call) can be obtained using the following Mathematical Equation I.

[Mathematical Equation I]

Actual bandwidth usage per voice call [kbps]=(header size+(payload size×No. of frames)×(1 sec/codec sampling frequency×No. of frames)×0.4 (in case silence suppression is enabled)

Based on the above equation, the actual bandwidths per VoIP codec are calculated (the actual bandwidth usage per voice call) and summarized in the following table 1.

V.27 2.4 kbps: 12 byte/40 ms (payload/transfer frequency)

V.27 4.8 kbps: 24 byte/40 ms

V.29 7.2 kbps: 36 byte/40 ms

V.29 9.6 kbps: 48 byte/40 ms

V.33 12 kbps: 60 byte/40 ms

V.33 14.4 kbpts: 72 byte/40 ms

The result of actual bandwidth calculation according to the above data transfer methods obtained from the Mathematical Equation II is shown in Table 2. For the calculation, the same header size with the VoIP voice packet, 54 bytes, is used. In other words, the header size 54 bytes is obtained from the addition of RTP header 12 bytes, UDP header 8 bytes, IP header 20 bytes, and the Ethernet header 14 bytes.

TABLE 1

| CODEC | G.711 | | G.723.1 5.3 kbps | | G.723.1 6.3 kbps | | G.729A | |
|---|---|---|---|---|---|---|---|---|
| FRAME | SSE | SSD | SSE | SSD | SSE | SSD | SSE | SSD |
| 1 | 60.5 k | 150.4 k | 7.9 k | 19.7 k | 8.3 k | 20.8 k | 20.5 k | 51.2 k |
| 2 | 42.9 k | 107.2 k | 5.0 k | 12.5 k | 5.4 k | 13.6 k | 11.8 k | 29.6 k |
| 3 | 37.1 k | 92.8 k | 7.0 k | 10.1 k | 4.9 k | 11.2 k | 9.0 k | 22.4 k |
| 4 | 34.2 k | 85.6 k | 3.6 k | 8.9 k | 4.4 k | 10.9 k | 7.5 k | 18.8 k |
| 5 | 32.5 k | 81.3 k | 3.3 k | 8.2 k | 3.7 k | 9.3 k | 6.6 k | 16.6 k |
| 6 | 31.4 k | 78.4 k | 3.1 k | 7.7 k | 3.5 k | 8.8 k | 6.1 k | 15.2 k |
| 7 | 30.5 k | 76.3 k | | | | | 5.6 k | 14.1 k |
| 8 | 30.0 k | 74.8 k | | | | | 5.4 k | 13.4 k |
| 9 | 29.4 k | 73.6 k | | | | | 5.1 k | 12.8 k |
| 10 | 29.0 k | 72.6 k | | | | | 4.9 k | 12.3 k |

In Table 1, SSE is an abbreviation for "silence suppress enable", and SSD is an abbreviation for "silence suppress disable". The unit of bandwidths is kbps.

TABLE 2

| V.xx bandwidth | V.27 2.4 k | V.27 4.8 k | V.29 7.2 k | V.29 9.6 k | V.33 12 k | V.33 14.4 k |
|---|---|---|---|---|---|---|
| FoIP bandwidth | 13.2 k | 15.6 k | 18.2 k | 20.4 k | 22.8 k | 25.6 k |

The manner in which the gateways 6 and 10 of FIG. 1 calculate the bandwidth usage when FoIP fax call is concerned is now illustrated. In the case of the FoIP fax call, the silence suppression function and the multiframe transfer function are not processed at all so that there is no way to decrease the bandwidth based on those functions.

Instead, the following Mathematical Equation II teaches how to calculate the actual bandwidth usage according to the fax data transfer method, that is, the actual bandwidth usage per fax call.

[Mathematical Equation II]

Actual bandwidth usage per fax call [kbps]=(header size+(payload size)×(1 sec/transfer frequency))

There are different kinds of FoIP fax data transfer methods as follows:

As mentioned above, the gateways 6 and 10 shown in FIG. 1 directly calculate the bandwidth usage in the VoIP service network in consideration of both the VoIP voice call process and the FoIP fax call process.

Then, the gateways 6 and 10 transceive the bandwidth usage calculated by the above method. More specifically, after calculating the bandwidth usage, the gateway transfers a message to a remote gateway UDP (User Datagram Protocol) so that the remote gateway can decide whether the incoming call is enabled or snot. Also, the gateway checks the total bandwidth usage of the local gateway so that, if the total bandwidth exceeds the limit bandwidth, it blocks the local gateway usage during an outgoing call or has the remote gateway process the call to a detour route.

Using the bandwidths calculated above, the gateways 6 and 10 control the bandwidths, and its procedure is now explained.

Before getting into further details, it should be understood that the VoIP service network has a plurality of gateways similar to the gateways 6 and 10 shown in FIG. 1. In fact, two gateways 6 and 10 are introduced in FIG. 1 as a matter of convenience for explaining the present invention.

Figure 3:
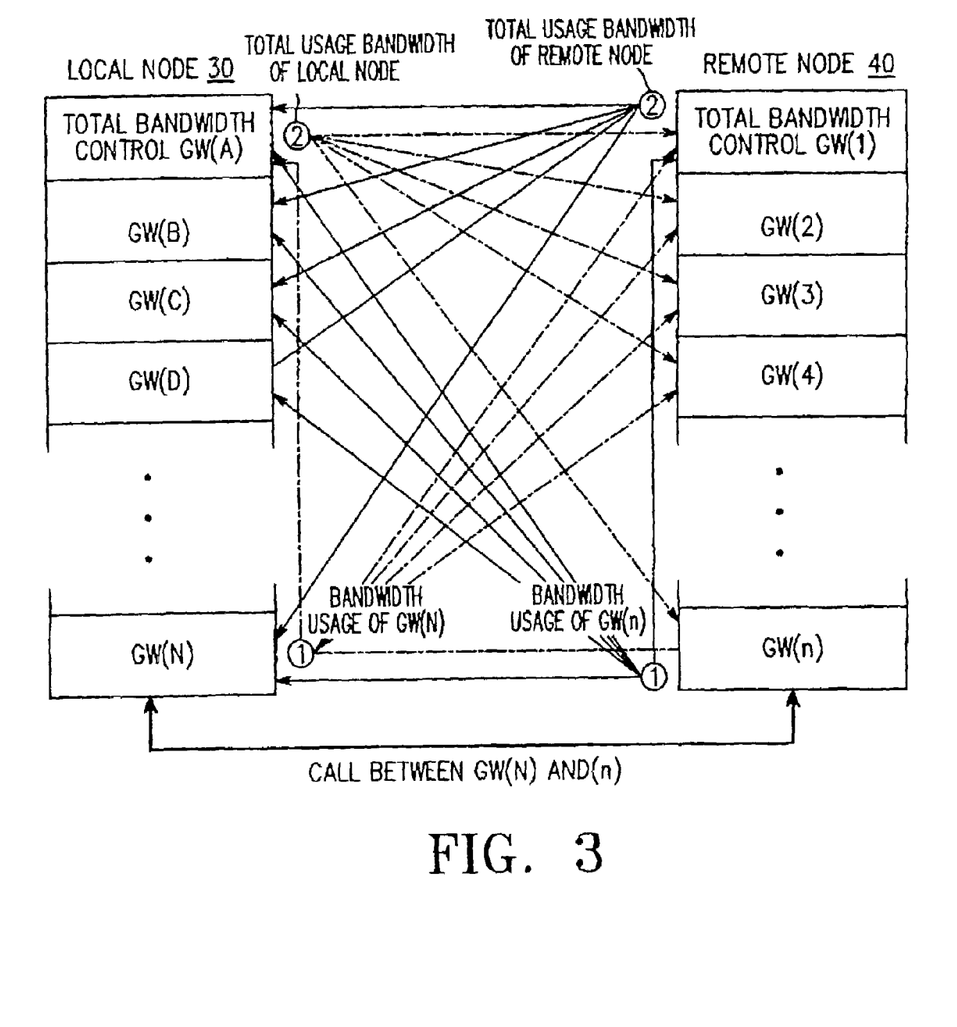
FIG. 3 is a flow chart of a detailed configuration of gateways and depicts bandwidth control according to a preferred embodiment of the present invention.

FIG. 3 shows a detailed configuration of gateways 6 and 10 and signals for bandwidth control according to the embodiment of the present invention. As shown in the drawing, one of the gateways 6 and 10 on the calling subscriber side is named as a local node 30, and the other gateway on the called subscriber side is named as a remote node 40. The local and remote nodes 30 and 40, respectively, are provided with a plurality of gateway modules, GW (A)–(N) and GW (1)–GW(n), respectively. These gateway modules GW (A)–(N) and GW (1)–GW (n) support tens of channels (e.g., 16 channels) per module, and can be expanded to meet the required capacity of a corresponding area. Particularly, among the plural of gateway modules GW (A)–(N) and GW (1)–GW (n) provided in each local node 30 and each remote node 40, respectively, the module GW(A) and GW (1) are total bandwidth control gateways for controlling the total bandwidth of nodes according to the present invention.

For example, in making a voice call between the gateway module GW (N) of the local node 30 and the gateway module GW (n) of the remote node 40, the VoIP call is processed between the gateway modules, GW (N)–GW (n), and the actually used codec is determined by VoIP signaling. After that, the gateway module GW (N) of the local node 30 transfers the actual bandwidth usage of the gateway module GW (N), obtained from the above mathematical equation, to each of the gateway modules GW (1) to GW (n) of the remote node 40, and at the same time, transfers the actual bandwidth usage of the GW (N) to the total bandwidth control gateway module GW (A) of the local node 30. Similarly, the gateway module GW (n) of the remote node 40 transfers the actual bandwidth usage of the gateway module GW (n) to each of the gateway modules GW (A)–GW (N) of the local node 30, and transfers the actual bandwidth usage of the GW (n) to the total bandwidth control gateway module GW (1).

Upon receiving the actual bandwidth usage of GW (N) and the actual bandwidth usage of GW (n), each of the total bandwidth control gateway modules GW (A) and GW (1), respectively, calculates the total bandwidth usage in the nodes 30 and 40, respectively. If the total bandwidth usage at the local node 30 is changed from the previous total bandwidth usage, the total bandwidth control gateway module GW (A) of the local node 30 transfers the calculated total bandwidth usage of the local node 30 to individual gateway module GW (1) to GW (n) of the remote node 40. Similarly, if the total bandwidth usage at the local node 40 is changed from the previous total bandwidth usage, the total bandwidth control gateway module GW (1) of the remote node 40 transfers the calculated total bandwidth usage of the remote node 40 to individual gateway module GW (A) to GW (N) of the local node 30. In this way, each gateway module GW (A) to GW (N) of the al a mode 30 is informed of the total bandwidth usage of the remote node 40 and the bandwidths used by the remote node gateway modules GW (1) to GW (N). Therefore, each gateway module GW (A) to GW (N) of the local node 30, can refer to the total bandwidth usage of the remote node 40 and the bandwidths used by the remote node gateway modules GW (1) to GW (N), and can perform very effective routing.

In short, the total bandwidth control gateway GW (A) of the local node 30 calculates total bandwidth usage between remote nodes (by adding to the associated bandwidth usage according to a call attempt, and by subtracting from the associated bandwidth usage according to a call clear) using the remote node information and the bandwidth usage of the gateway module GW (N) which the gateway module GW (N) had transmitted, and transfers the calculation to each of the gateways GW (1) to GW (n) of the remote node 40. Furthermore, the total bandwidth control gateway GW (1) of the remote node 40 performs the same operation. In addition, according to the call setup and the call termination procedure, each gateway mode belonging to the local node 30 and each gateway node belonging to the remote node 40 transfers the bandwidth usage, except for its own bandwidth, to gateway modules of the other node. As a result, the gateway module of each node is informed of the total bandwidth usage between the node to which it belongs and another node, and the bandwidth usage of the remote gateway module. This bandwidth information is used as a reference value at the time of call setup.

The operation according to the embodiment of the present invention is now detailed below. As shown in FIG. 3, it is assumed that at least one call is transferred from the gateway module GW (N) of the local node 30 to the gateway module GW (n) of the remote node 40.

Figure 4:
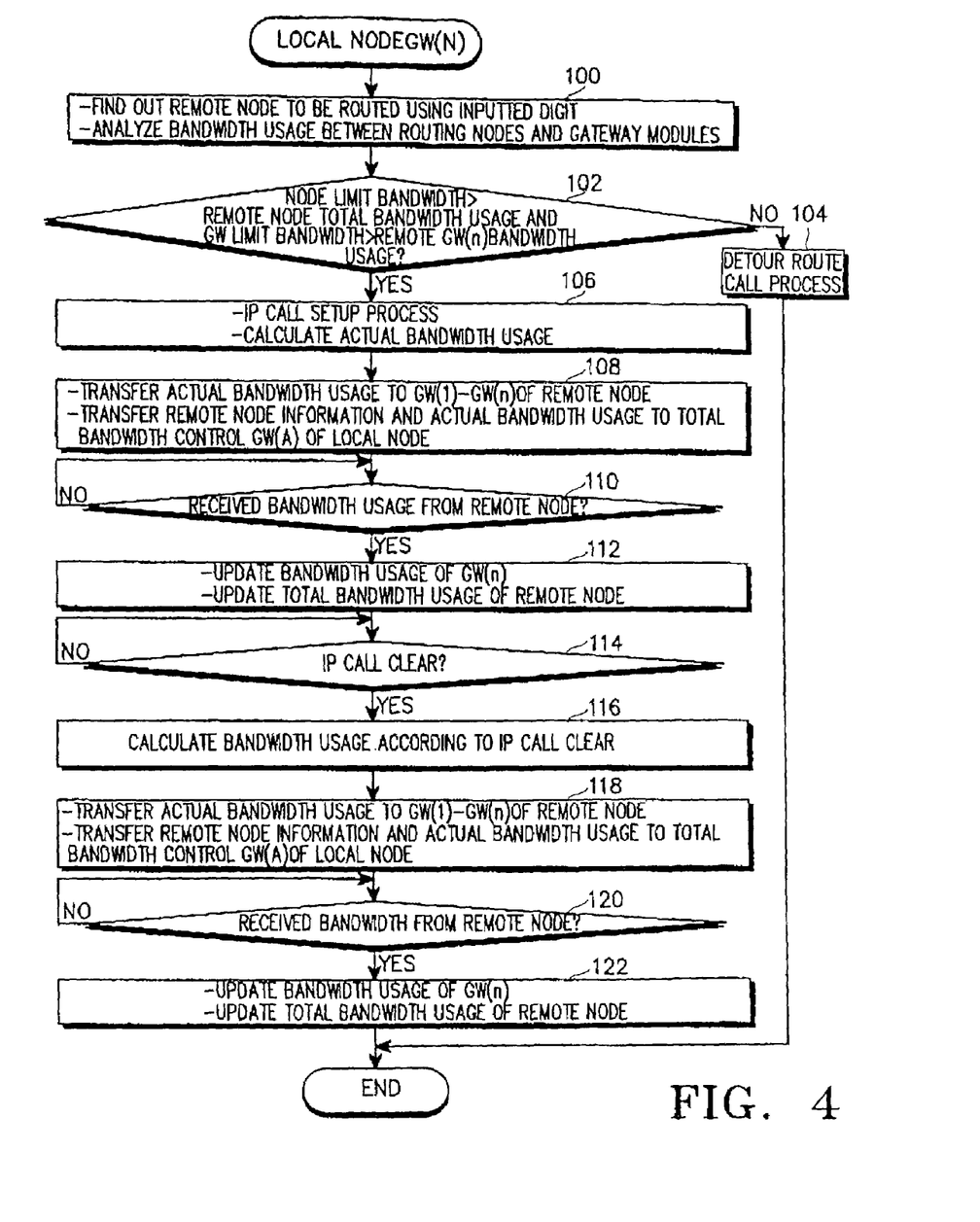
FIG. 4 is a flow chart of operation control in a gateway module (GW(n)) of a local node according to the preferred embodiment of the present invention.

With reference to FIG. 3 and FIG. 4, the operation at the gateway module GW (N) of the local node 30 is explained. First, at step 100 of FIG. 4, the gateway module GW (N) of the local node 30 uses the digit inputted to the gateway module GW (N) to determine a call request from the gateway module GW (n) of the remote mode 40. Then, it analyzes the internally stored (and previously updated) total bandwidth usage of the remote node 40 and the bandwidth usage of the gateway module GW (n) of the remote node 40. At step 102, it is determined whether the node bandwidth limit is greater than the total bandwidth usage of the gateway module GW (n) of the remote node 40, and whether gateway module bandwidth limit is greater than the bandwidth usage of the gateway module GW (n) of the remote node 40. Exceeding the bandwidth limit means that there are few bandwidths available between the local node and the remote node, and between the gateway modules of both nodes. Therefore, if it turns out at step 102 that the total bandwidth usage is equal to or greater than the bandwidth limit, the operation proceeds to step 104 of FIG. 4, and performs a detour call process. However, if the total bandwidth usage is less than the bandwidth limit, the operation proceeds to step 106 of FIG. 4.

In step 106, the gateway module GW (N) of the local node 30 takes care of IP call setup, and calculates the actual used bandwidth between the gateway modules GW (N) and GW (n). For instance, the gateway module GW (N) of the local node 30 checks the packets that are transferred to the signaling unit and the actual RTP (Realtime Transfer Protocol), and calculates the actual bandwidth usage between the gateway modules GW (N) and GW (n). In this regard, the calculation of the actual bandwidth usage encompasses the calculation of the total bandwidth usage of every call that is currently being processed through GW (N), and that process has already been explained. Following this, at step 108, the gateway module GW (N) transfers the calculated bandwidth usage to each of the gateway modules GW (1) to GW (n) of the remote node 40. At this time, the gateway module GW (N) of the local node 30, with reference to a remote IP (Internet Protocol) table of its own, transfers the calculated actual bandwidth usage to each of the gateway modules GW (1) to GW (n) of the remote node 40. Although the VoIP service network illustrated in FIG. 1 and FIG. 3 includes the remote node 40 only, if (for example) the VoIP service network includes nodes A, B, C, D, the gateway module GW (N) of the local node 30 transfers the calculated actual bandwidth usage to each of the gateway modules of the nodes A, B, C, D. For instance, the gateway module GW (N) transfers the calculated actual bandwidth usage to the gateway modules of every node except for the gateway modules of its own node. This is due to the fact that the traffic should be distributed. Also, at step 108, the gateway module GW (N) of the local node 30 transfers the IP address of the remote node 40 and the bandwidth usage of GW (N) to the total bandwidth control gateway module GW (A) of the local node 30.

In step 110 of FIG. 4, it is determined whether the bandwidth usage is received from the remote node 40. This step is carried out because the remote node 40, in a manner similar to the procedures of FIG. 3, transfers the bandwidth usage of the remote node gateway module GW (n) and the total bandwidth of the remote node 40 to the gateway modules GW (A) to GW (N) of the local node 30. If, in step 110 of FIG. 4, it turns out that the bandwidth is received from the remote node 40, the operation proceeds to step 112 of FIG. 4, and updates the bandwidth usage of the remote node gateway module GW (n) and the total bandwidth usage of the remote node 40.

In step 114, the local node gateway module GW (N) determines whether the IP call between the gateway module GW (N) of the local node 30 and the gateway module GW (n) of the remote mode 40 is cleared. If the IP call is terminated or cleared, step 116 is carried out, and bandwidth usage is calculated in accordance with the termination of the IP call. Then, steps 118 thru 122 are carried out. Steps 116 thru 122 of FIG. 4 are actually identical to steps 108 thru 112. In short, depending on the IP call termination, increase or decrease of the total bandwidth usage of the local node 30 and the remote node 40 takes place, and the bandwidth usage of the local node gateway module GW (N) and that of the remote node gateway module GW (n) are updated.

The operation of the total bandwidth control gateway module GW (A) of the local node 30 is now explained with reference to FIG. 3 and FIG. 5.

Figure 5:
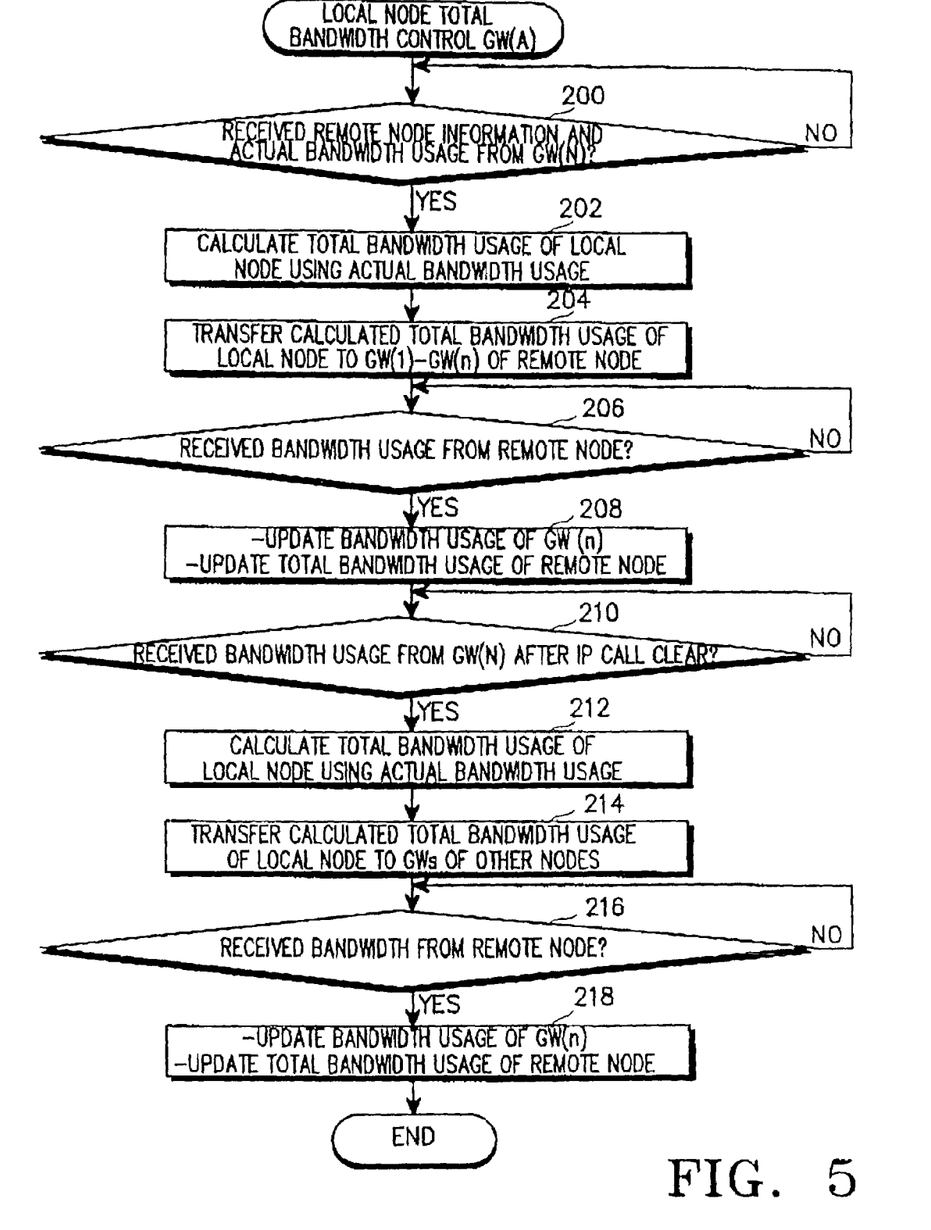
FIG. 5 is a flow chart of operation control in a total bandwidth control gateway module (GW(A)) of the local node according to the preferred embodiment of the present invention.

In step 200 of FIG. 5, if the total bandwidth control gateway module GW (A) of the local node 30 receives the IP address of the remote node and the actual bandwidth usage of GW (N) from the local node gateway module GW (N), step 202 is executed, and the total bandwidth control gateway module GW (A) calculates the total bandwidth usage of the local node 30 using the actual bandwidth usage of the GW (N). After this, in step 204 of FIG. 5, the calculated total bandwidth usage of the local node 30 is transferred to each gateway module GW (1) to GW (n) of the remote node 40. Step 204 of FIG. 5 corresponds to the procedures of FIG. 3.

In step 206 of FIG. 5, the local node total bandwidth control gateway module GW (A) determines whether the bandwidth usage is received from the remote node 40. This step is carried out because the remote node 40, similar to the procedures of FIG. 3, transfers the bandwidth usage of the remote node gateway module GW (n) and the total bandwidth of the remote node 40 to the gateway modules GW (A) to GW (N) of the local node 30. If, in step 206 of FIG. 5, it turns out that the bandwidth is received from the remote node 40, the operation proceeds to step 208 of FIG. 5, and updates the bandwidth usage of the remote node gateway module GW (n) and the total bandwidth usage of the remote node 40.

In the meantime, after the IP call between the gateway module GW (N) of the local node 30 and the gateway module GW (n) of the remote node 40 is cleared, the local node gateway module GW (N) recalculates the bandwidth usage following the IP call termination, and transfers the calculation to the total bandwidth control gateway module GW (A) of the local node 30. The local node total bandwidth control gateway module GW (A), on the other hand, decides in step 210 of FIG. 5 whether the actual bandwidth usage is received from the local node gateway module GW (N). If it is received, the operation proceeds to step 212. Steps 212 and 214 are identical to steps 202 and 204. That is, the total bandwidth usage of the local node 30 is first calculated, and the calculation is transferred to each gateway module of the other nodes.

In step 216 of FIG. 5, the local node total bandwidth control gateway module GW (A) determines whether the bandwidth is received from the remote node 40. This step is carried out because the remote node 40, similar to the procedures of FIG. 3, transfers the bandwidth usage of the remote node gateway module GW (n) and the total bandwidth of the remote node 40 to the gateway modules GW (A) to GW (N) of the local node 30. If, in step 216 of FIG. 5, it turns out that the bandwidth is received from the remote node 40, the operation proceeds to step 218 of FIG. 5, and updates the bandwidth usage of the remote node gateway module GW (n) and the total bandwidth usage of the remote node 40.

Next, the operation of the gateway module GW (n) of the remote node 40 is explained with reference to FIG. 3 and FIG. 6. The gateway module GW (n) of the remote node 40 sets the IP call up between the gateway module GW (N) of the local node 30 and the gateway module GW (n) of the remote node 40 and then calculates the actual bandwidth usage at the gateway module GW (n) in accordance therewith at step 300. The calculation method of the bandwidth usage has already been explained. After that, in step 302, the remote node gateway module GW (n) transfers the calculated bandwidth usage to each of the gateway modules GW (A) to GW (N) of the local node 30. At this time, the gateway module GW (n) of the remote node 40, with reference to its own remote IP (Internet Protocol) table, transfers the calculated actual bandwidth usage to each of the gateway modules GW (A) to GW (N) of the local node 30. Although the VoIP service network illustrated in FIG. 1 and FIG. 3 includes the local node 30 only, if (for example) the VoIP service network includes nodes A, B, C, D, the gateway module GW (n) of the remote node 40 transfers the calculated actual bandwidth usage both to the local node 30 and to each gateway module of the nodes A, B, C, D. For instance, the remote node gateway module GW (n) transfers the calculated actual bandwidth usage to the gateway modules of every node except for the gateway modules GW (2) to GW (n−1) of its own node. This is done because the traffic should be distributed. Also, the remote node gateway module GW (n) transfers the IP address of the local node 30 and the bandwidth usage of GW (n) to the total bandwidth control gateway module GW (A) of the remote node at step 302 of FIG. 6. In fact, step 302 of FIG. 6 corresponds to the procedures of FIG. 3.

Figure 6:
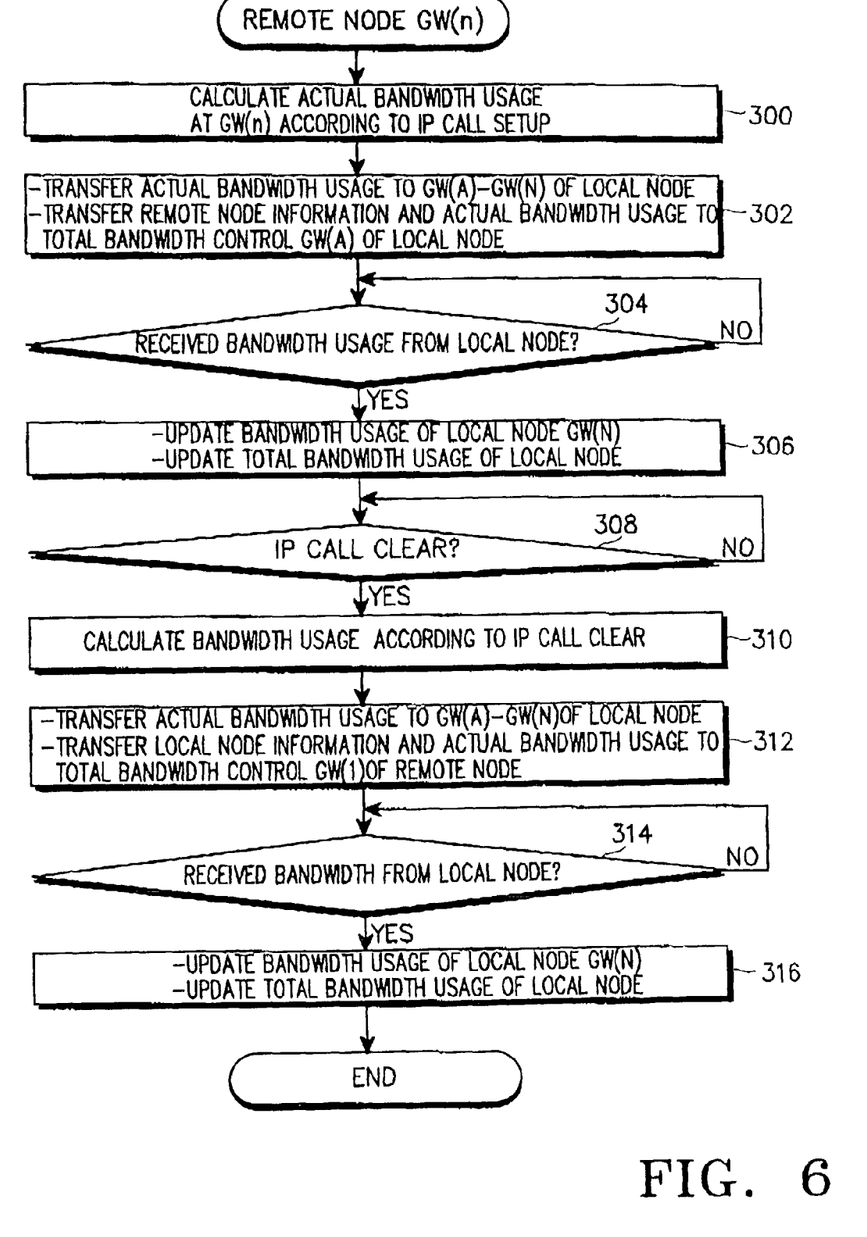
FIG. 6 is a flow chart of operation control in a gateway module (GW(n)) of a remote node according to the preferred embodiment of the present invention.

In step 304 of FIG. 6, the remote node gateway module GW (n) determines whether the bandwidth usage is received from the local node 30. This step is necessary because the local node 30, similar to the procedures of FIG. 3, transfers the bandwidth usage of the local node gateway module GW (N) and the total bandwidth of the local node 30 to the gateway modules GW (1) to GW (n) of the remote node 40. If, in step 304 of FIG. 6, it turns out that the bandwidth is received from the local node 30, the operation proceeds to step 306 of FIG. 6, and updates the bandwidth usage of the local node gateway module GW (N) and the total bandwidth usage of the local node 30.

In step 308, the remote node gateway module GW (n) determines whether the IP call between the gateway module GW (N) of the local node 30 and the gateway module GW (n) of the remote mode 40 is cleared. If the IP call is terminated, step 310 is carried out, and the bandwidth usage at the remote note gateway module GW (n) following the IP call setup is calculated. After step 310 of FIG. 6, steps 312 thru 316 of FIG. 6 are carried out, and they are similar to steps 302 thru 306. In short, depending on the IP call termination, increase or decrease of the total bandwidth usage of the local node 30 and the remote node 40 takes place, and the bandwidth usage of the local node gateway module GW (N) and that of the remote node gateway module GW (n) are updated.

Finally, the operation of the total bandwidth control gateway module GW (1) of the remote node 40 is now explained with reference to FIG. 3 and FIG. 7.

Figure 7:
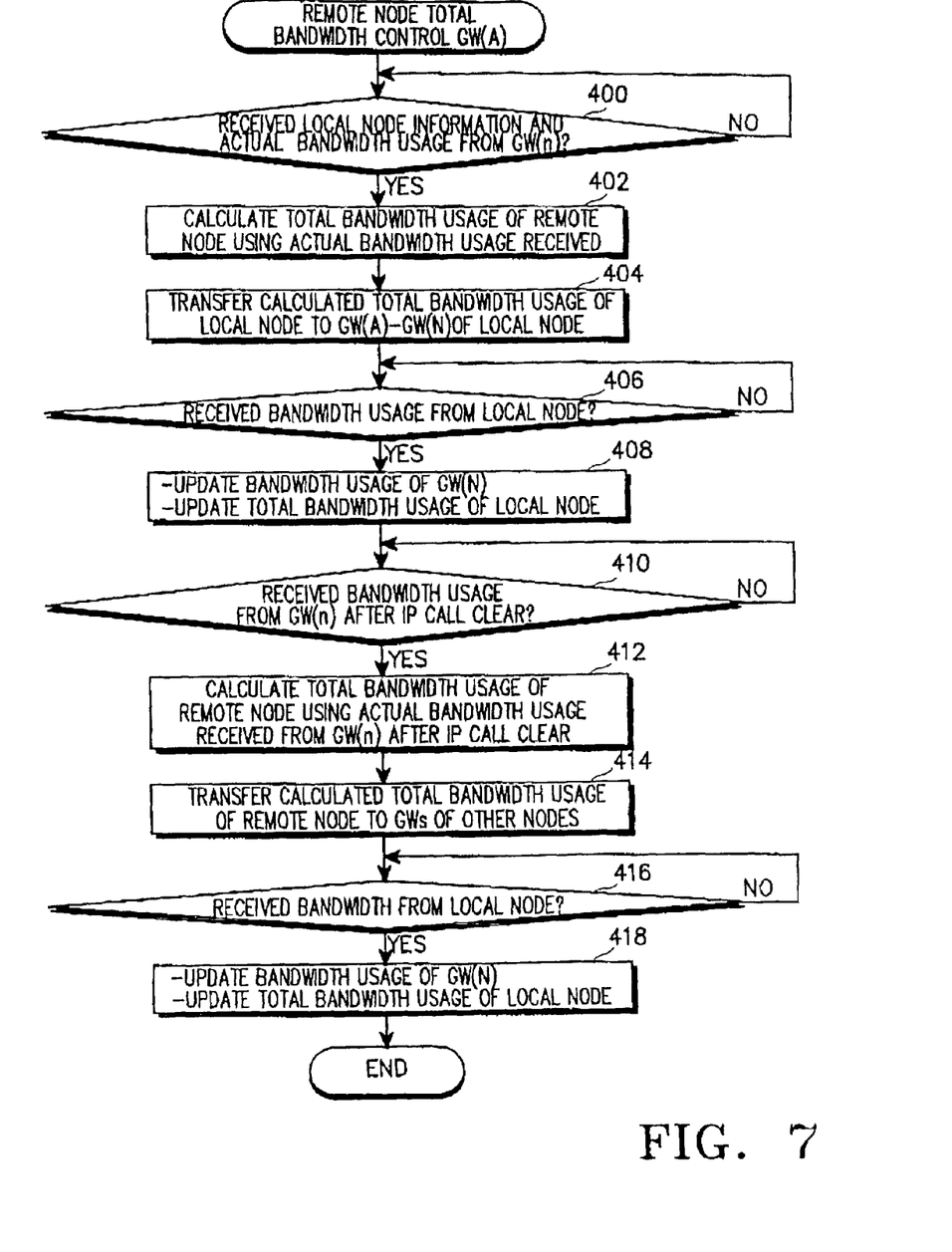
FIG. 7 is a flow chart of operation control in a total bandwidth control gateway module (GW(1)) of the remote node according to the preferred embodiment of the present invention.

In step 400 of FIG. 7, if the total bandwidth control gateway module GW (1) of the remote node 40 receives the IP address of the local node and the actual bandwidth usage of GW (n) from the remote node gateway module GW (1), step 402 is executed, and the total bandwidth control gateway module GW (1) calculates the total bandwidth usage of the remote node 40 using the actual bandwidth usage of the GW (n). In step 404 of FIG. 7, the calculated total bandwidth usage of the remote node 40, obtained from step 204 of FIG. 5, is transferred to each gateway module GW (A) to GW (N) of the local node 30. Step 404 of FIG. 7 corresponds to the procedures of FIG. 3.

In step 406 of FIG. 7, the remote node total bandwidth control gateway module GW (1) determines whether the bandwidth usage is received from the local node 30. This step is carried out because the local node 30, similar to the procedures of FIG. 3, transfers the bandwidth usage of the local node gateway module GW (N) and the total bandwidth of the local node 30 to the gateway modules GW (1) to GW (n) of the remote node 40. If, in step 406 of FIG. 7, it turns out that the bandwidth is received from the local node 30, the operation proceeds to step 408 of FIG. 7, and updates the bandwidth usage of the local node gateway module GW (N) and the total bandwidth usage of the local node 30.

Meanwhile, after the IP call between the gateway module GW (N) of the local node 30 and the gateway module GW (n) of the remote node 40 is cleared, the remote node gateway module GW (n) recalculates the bandwidth usage following the IP call termination, and transfers the calculation to the total bandwidth control gateway module GW (1) of the remote node. The remote node total bandwidth control gateway module GW (1), on the other hand, determines in step 410 of FIG. 7 whether the actual bandwidth usage is received from the remote node gateway module GW (n). If it is, the operation proceeds to step 412. Steps 412 and 414 are identical to steps 402 and 404. That is, the total bandwidth usage of the remote node 40 is first calculated, and the calculation is transferred to every gateway module of other nodes.

In step 416 of FIG. 7, the remote node total bandwidth control gateway module GW (1) determines whether the bandwidth usage is received from the local node 30. This step is carried out because the local node 30, similar to the procedures of FIG. 3, transfers the bandwidth usage of the local node gateway module GW (N) and the total bandwidth of the local node 30 to the gateway modules GW (1) to GW (n) of the remote node 40. If, in step 416 of FIG. 7, it turns out that the bandwidth is received from the local node 30, the operation proceeds to step 418 of FIG. 7, and updates the bandwidth usage of the local node gateway module GW (N) and the total bandwidth usage of the local node 40.

As explained before, according to the present invention, the gateway calculates the total bandwidth usage in consideration of the number of calls currently being processed and the usage codec of each call. Then, the calculation is transferred to the remote gateway, and it is determined whether the remote gateway is able to make an incoming call. Moreover, in checking the total bandwidth usage of the local gateway, if it exceeds the bandwidth limit, the local gateway is blocked during the outgoing call or processes the call to a detour route. Every time the bandwidth of the local gateway currently being used is either increased or decreased, the bandwidth used for an actual call is calculated, and the result is transferred to the bandwidth control gateway that calculates (increases/decreases) the bandwidth between nodes, and to the remote gateway. Also, the gateway reports the bandwidth and remote nodes that are increased or decreased at the local bandwidth, enabling the local bandwidth control gateway module to calculate the bandwidth between nodes, and reports the calculated bandwidth between nodes to each remote gateway. Then, each gateway, using the total bandwidth between nodes and the actually used total bandwidth of each individual gateway, can perform VoIP call routing more effectively.

Although the embodiment of the present invention described above illustrates the VoIP service network without a gatekeeper, the present invention can be incorporated in a VoIP service network having a gatekeeper. For example, if the gatekeepers can have the total bandwidth control gateway module function that originally belongs to the local node and the remote node, more effective control over the bandwidth is also possible.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A method for controlling bandwidth in a Voice over Internet Protocol (VoIP) system which includes a first node and a second node, wherein the first node and the second node are provided with gateways, and the gateways support a plurality of channels and are capable of performing bidirectional communication between endpoint terminals, the method comprising the steps of:

comparing, at a plurality of gateway devices of the first node that received a call setup request from one of the endpoint terminals, a predetermined bandwidth limit of the second node to be routed and a bandwidth limit of a corresponding gateway device of the second node with a bandwidth usage of the second node received from the second node and a bandwidth usage of a corresponding gateway device of the second node;

processing selectively, at each gateway device of the first node, an Internet protocol call setup according to a result of said comparing step, and calculating actual bandwidth usage of said each gateway device in consideration of a number of calls that are currently being processed and an actual packet size of each of said calls; and transferring the calculated actual bandwidth usage of said each gateway device to each of the plurality of gateway devices of the second node.

2. The method according to claim 1, wherein the calculation of actual bandwidth usage for each voice call necessary for the calculation of the actual bandwidth usage is carried out by including at least one of a silence suppress function and a multiframe transfer function.

3. The method according to claim 2, wherein calculation of actual bandwidth usage for each voice call necessary for the calculation of the actual bandwidth usage is carried out by using a mathematical equation as follows:

actual bandwidth usage for each voice call [kbps]= (header size+(payload size×number of frames)×(1 sec/codec sampling frequency×number of frames))×0.4 in a case where the silence suppress function is enabled.

4. The method according to claim 1, wherein calculation of actual bandwidth usage for each fax call necessary for the calculation of the actual bandwidth usage is carried out by using a mathematical equation as follows:

actual bandwidth usage for each fax call [kbps]= header size+((payload size×number of frames)×(1 sec/transfer frequency)).

5. A method for controlling bandwidth in a Voice over Internet Protocol (VoIP) system which includes a first node and a second node, wherein the first node and the second node are provided with gateways, and the gateways support a plurality of channels and are capable of performing bidirectional communication between endpoint terminals, the method comprising the steps of:

assigning one of the gateways of the first node and one of the gateways of the second node to a total bandwidth control gateway of the first node and a total bandwidth control gateway of the second node, respectively;

comparing, at a plurality of gateway devices of the first node that received a call setup request from one of the endpoint terminals, a predetermined bandwidth limit of the second node to be routed and a bandwidth limit of a corresponding gateway device of the second node with a bandwidth usage of the second node received from the second node and a bandwidth usage of a corresponding gateway device of the second node;

processing selectively, at each gateway device of the first node, an Internet protocol call setup according to a result of said comparing step, and calculating actual bandwidth usage of said each gateway device in consideration of a number of calls that are currently being processed and an actual packet size of each of said calls;

transferring the calculated actual bandwidth usage of said each gateway device to each of the plurality of gateway devices of the second node;

transferring the calculated actual bandwidth usage to the total bandwidth control gateway of the first node; and calculating, at the total bandwidth control gateway of the first node, a total bandwidth usage at the first node using the calculated actual bandwidth usage, and transferring the calculated total bandwidth usage of the first node to the total bandwidth control gateway device of the second node.

6. The method according to claim 5, wherein calculation of actual bandwidth usage for each voice call necessary for the calculation of the actual bandwidth usage is carried out by using a mathematical equation as follows:

actual bandwidth usage for each voice call [kbps]= (header size+(payload size×number of frames)×(1 sec/codec sampling frequency×number of frames))×0.4 in a case where the silence suppress function is enabled.

7. The method according to claim 5, wherein calculation of actual bandwidth usage for each fax call necessary for the calculation of the actual bandwidth usage is carried out by using a mathematical equation as follows:

actual bandwidth usage for each fax call [kbps]= header size+((payload size×number of frames)×(1 sec/transfer frequency)).

8. A method for controlling bandwidth in a Voice over Internet Protocol (VoIP) system which includes a first node and a second node, wherein the first node and the second node are provided with gateways, and the gateways support a plurality of channels and are capable of performing bidirectional communication between endpoint terminals, the method comprising the steps of:

assigning one of the gateways of the first node and one of the gateways of the second node to a total bandwidth control gateway of the first node and a total bandwidth control gateway of the second node, respectively;

calculating, at a plurality of gateway devices of the first node that received a call clear request from one of the endpoint terminals, an actual bandwidth usage of each of said gateway devices in consideration of a number of calls that are currently being processed in response to the call clear request and an actual packet size of each of said number of calls;

transferring the calculated actual bandwidth usage of said each gateway device to each of the plurality of gateway devices of the second node;

transferring the calculated actual bandwidth usage to the total bandwidth control gateway of the first node; and calculating, at the total bandwidth control gateway of the first node, a total bandwidth usage at the first node using the calculated actual bandwidth usage, and transferring the calculated total bandwidth usage of the first node to the total bandwidth control gateway device of the second node.

9. A method for controlling bandwidth in a Voice over Internet Protocol (VoIP) system which includes a first node and a second node, wherein the first node and the second node are provided with gateways, and the gateways support a plurality of channels and are capable of performing bidirectional communication between endpoint terminals, the method comprising the steps of:

calculating, at a certain gateway of the second node, actual bandwidth usage of the certain gateway device of the second node in consideration of a number of calls that are currently being processed and an actual packet size of each call of said calls, each of said gateways of the second node being a destination of an individual gateway device of the first node which received a call setup request from one of the endpoint terminals;

transferring the calculated actual bandwidth usage to a corresponding call setup gateway device of the first node; and updating, at the certain gateway device of the second node, the calculated actual bandwidth usages calculated at the gateway devices of the first node and transferred to the certain gateway device of the second node.

* * * * *